United States Patent [19]

Dickinson

[11] Patent Number: 4,971,282
[45] Date of Patent: Nov. 20, 1990

[54] CLIP

[76] Inventor: John A. Dickinson, 35 Howard Road, Point Howard, Eastbourne, Wellington, New Zealand

[21] Appl. No.: 399,001

[22] Filed: Aug. 28, 1989

[30] Foreign Application Priority Data

Aug. 26, 1988 [NZ] New Zealand ............... 225941

[51] Int. Cl.$^5$ ............................. A47B 96/06
[52] U.S. Cl. .................... 248/231.8; 47/47
[58] Field of Search ......... 248/231.4, 300, 231.8; 47/44, 46, 47; 24/465, 546; 256/54

[56] References Cited

U.S. PATENT DOCUMENTS

| 527,959 | 10/1894 | Flesher | 47/46 |
| 2,851,823 | 9/1958 | Peterson | 47/47 |
| 2,968,850 | 1/1961 | Tinnerman | 47/47 X |
| 3,131,447 | 5/1964 | Tinnerman | 248/231.8 |
| 3,518,791 | 7/1970 | Carson et al. | |
| 4,329,762 | 5/1982 | Maidhof | 47/44 X |

FOREIGN PATENT DOCUMENTS

| 0270931 | 6/1988 | European Pat. Off. | 47/46 |
| 807237 | 6/1951 | Fed. Rep. of Germany. | |
| 1116466 | 11/1961 | Fed. Rep. of Germany. | |
| 307794 | 9/1972 | Fed. Rep. of Germany. | |
| 3009354 | 10/1981 | Fed. Rep. of Germany | 47/47 |
| 2067881 | 8/1971 | France. | |
| 2443197 | 7/1980 | France. | |
| 2536247 | 5/1984 | France | 47/44 |
| 111702 | 12/1917 | United Kingdom. | |

Primary Examiner—J. Franklin Foss
Attorney, Agent, or Firm—Oblon, Spivak, McClelland, Maier & Neustadt

[57] ABSTRACT

There is disclosed a clip which is useable to form an anchor for a tie element. The clip comprises a resiliently deformable body having a pair of engagement means which can engage with an elongate support member. Each engagement means includes a locating arrangement which, in use, substantially anchors the body against longitudinal movement on the support member. The body has at least two apertures via which a tie element can be attached to the body.

10 Claims, 2 Drawing Sheets

CLIP

BACKGROUND OF THE INVENTION

Field of the Invention

In the horticulture industry there are a wide variety of situations in which a growing plant must be supported during at least its early stages of growing. Such support can often be provided by a growing frame or structure to which the plant is tied by suitable ties. With trees for example, the support can be a stake inserted in the ground adjacent each tree. In an alternative arrangement a wire or series of wires can be strung alongside a line of growing or sapling trees and a tie or ties is/are engaged around the wire(s) and tree to tie the tree to the wire(s).

With either of the aforementioned support arrangements, it is difficult to anchor the tie to the stake or wire. As a result the tie can move away from its optimum position and thus this can lead to the desired support effect being lost. This is particularly so with the wire support arrangement as the ties can, usually readily, slide along the wire.

Additionally, problems often arise with the ties themselves causing damage to the tender skin or bark of the growing plant. Generally ties are so constructed that the length thereof can be adjusted to that necessary to ensure that correct amount of encirclement of the plant and support is achieved. It is this construction which can often lead to damage. For example a well known form of tie consists of a molded plastic strap of the like, this strap having a plurality of teeth formed therein. The end of the strap can be engaged through a suitable slotted body portion which cooperates with the teeth to prevent the strap being drawn back through the slot. The teeth, or the actual profile of the strap itself (the strap usually being of fairly thin crosssection) can rub against the bark or skin of the plant and thereby cause damage.

SUMMARY OF THE INVENTION

The object of the present invention is to provide a clip which can be mounted to a support structure and provide an anchor for a tie member.

Broadly in one aspect, the present invention consists of a clip comprising a resiliently deformable body having a pair of engagement means which can engage with a support member, said engagement means having locating means which substantially anchor said body in position with said support member, the body having means for attachment thereto of at least one tie element.

Preferably the body is formed from sheet spring steel. The pair of engagement means can be in the form of a pair of parallel open ended slots. Preferably the inner ends of the slots are profiled so as to form locating means.

The attachment means can, in a preferred form of the invention, comprise a pair of openings through which a tie can be threaded.

BRIEF DESCRIPTION OF THE DRAWINGS

In the following more detailed description of the invention, reference will be made to the accompanying drawings in which.

DESCRIPTION OF THE PREFERRED EMBODIMENTS

According to the preferred form of the invention, the clip 10 is formed from sheet spring steel. The clip could, however, be formed from such other material which was suitable for the end purpose and which resulted in the body 11 of the clip being resiliently deformable.

Figure 1:
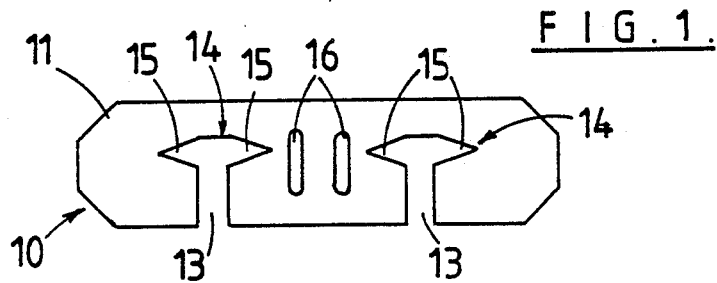
FIG. 1 is an elevational view of one embodiment of the clip.
Figure 2:
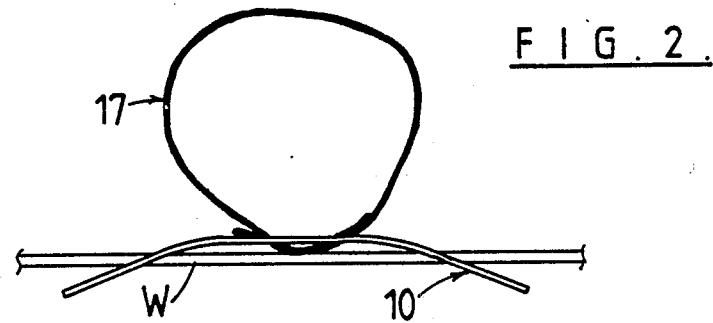
FIG. 2 is a plan view of the clip in conjunction with a wire support and a tie element

The clip shown in FIGS. 1 and 2 has a body 11 of elongate form. Extending in from one long side 12 thereof is a pair of spaced apart parallel open ended slots 13. The inner ends of these slots 13 are provided with a transverse portion 14, which as shown in FIG. 1 of the drawings, is formed by a pair of oppositely disposed triangular portions 15.

In use of the clip 10, and as shown in FIG. 2, the clip is engaged with a length of wire W by deforming the clip such that the wire W passes through slots 13 to become located in the transverse inner portions 14. This can be achieved by placing the wire through one slot 13 and then twisting and, by so doing, deforming the clip sufficiently for the wire to be inserted in the other slot 13. The clip is then permitted to try and return to its flat state and this causes the edges of the triangular portions 15 to engage with the peripheral surface of the wire W and effect a wedging action with the wire. As a consequence, the clip 10 is substantially anchored to the wire as longitudinal movement along the wire is prevented by the edges of the triangular portions 15 which tend to dig into the wire.

The attachment means for the tie element or elements consists of a pair of elongate slotted openings 16 which as illustrated in FIG. 1 are in a spaced apart parallel disposition. In the illustrated form the slots 16 are also parallel to slots 13, however, this is only by way of example and these slots could be disposed in a variety of other positions, eg parallel to the long sides of body 11.

In the form as illustrated in FIGS. 1 and 2 a strap member 17 has one end threaded through the slots 16 so that the strap can encircle a portion of the plant, (eg the trunk of a growing tree) and the other end inserted back through, in an opposite direction, the slots 16. The strap can be adjusted so as to provide the required diameter as to encircle the plant and give support thereto but also allow the plant to grow.

Preferably the tie 17 is formed of a plastics material which is UV stabilised. The strap 17 can, by way of example, be approximately 13 mm to 18 mm in width and of 1 mm to 2 mm in thickness. The side edges of the strap 17 are preferably rounded or of some other curved profile.

The clip of the invention provides a quick, easy and effective means for supporting plants particularly young trees. The design and construction enables the clip to be readily mounted on most sizes of fencing wire. The locking arrangement means that once in place the clip will remain in position even in the most adverse weather and climatic conditions. The clip which is preferably constructed of high quality spring steel and plated against corrosion, forms a stable base for a looped tie to extend about the portion of the plant where support is required.

Because the tie or strap 17 is wide, has a curved edge profile and is smooth (serrations not being needed to provide for adjustment of the length of the tie) damage to the skin of the plant is minimised even in high wind conditions. To accommodate different sized plants and growth in the plant being supported, the tie can be readily adjusted.

Savings in time taken to tie plants to a support structure can be achieved using the clip as it simply clicks onto the support wire and the tie is adjusted to length. No special tools are required to fit the clip or adjust the tie length. Even in high ambient temperatures the clip will remain in position on the support wire.

The clip is open to modification as shown in FIGS. 3 to 6 In this form the body 11 is wider and the slots 16 are disposed above the open ended slots 13. Also the shape of the triangular portions 15 are altered to be radiussed rather than triangular. In this form portions 15 will have curved ends which substantially conform with the peripheral shape of the wire.

Figure 5:
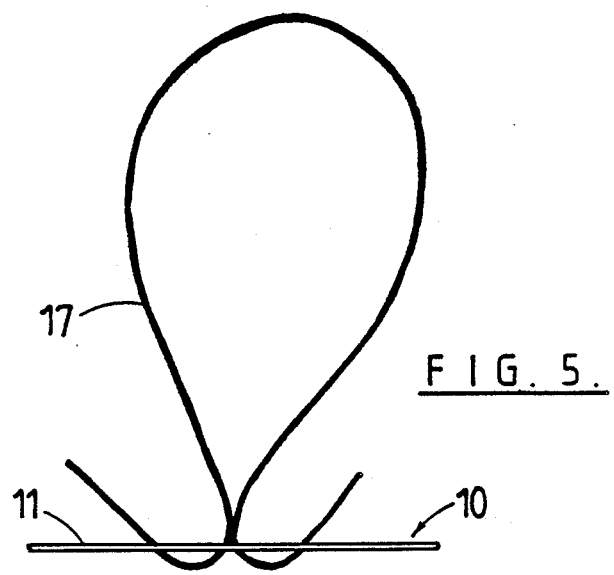
FIG. 5 is a plan view, in one direction, of the clip shown in FIG. 3 in conjunction with a tie.
Figure 6:
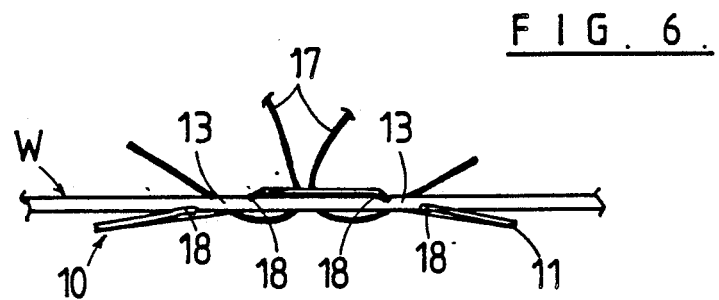
FIG. 6 is a plan view, from the other direction, of the clip as shown in FIG. 5 in place on a wire support.

In this form there are three slots 16 and as shown they have shallow serrated edges which provide for better grip of the strap 17. The three slots allow for different means of anchoring strap 17 to body 11. For example as illustrated in FIG. 5 the strap 17 has its ends threaded through the middle slot 16 with one end being directed through one outer slot 16 and the other through the other outer slot 16.

Figure 3:
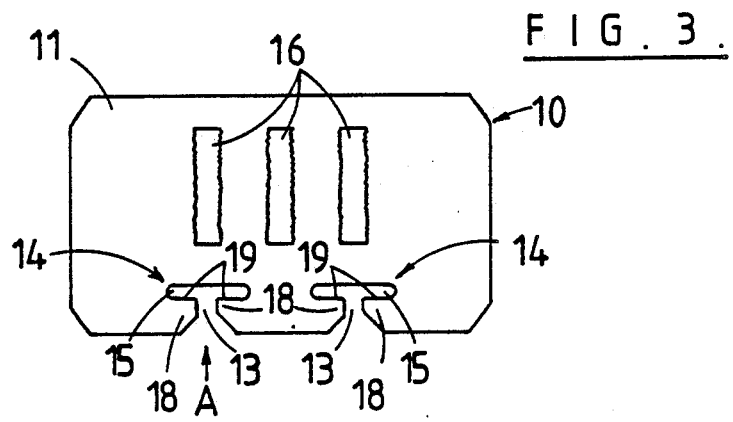
FIG. 3 is an elevation view of a second embodiment of the clip.
Figure 4:
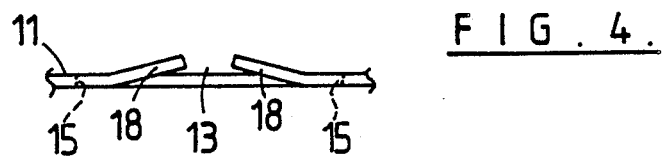
FIG. 4 is a detail view in the direction of Arrow A in FIG. 3.

The clip of FIG. 3 also incorporates flaps 18, which define the slot 13, profiled to form an entrance into the slot. These flaps 18 are also slightly angled outward as can be seen in FIG. 4. The edges 19 of flaps 18 thus tend to locate underneath the wire W when it is located in the clip. These edges 19 thus act against any upward force on the clip which may serve to disengage the clip from the wire.

Obviously, numerous modifications and variations of the present invention are possible in light of the above teachings. It is therefore to be understood that within the scope of the appended claims, the invention may be practiced otherwise than as specifically described herein.

What is claimed is:

1. A clip and tie combination for use in providing support from a support wire for a part of a plant, which comprises:
   a resiliently deformable body having at least two spaced apart elongate apertures and a pair of engagement means which are engagable with the support wire,
   said engagement means each being formed by an open ended slot, said slots extending in a spaced apart substantially parallel disposition from a common side of the body, said engagement means having locating means which, in use, engage in a wedging manner with said support wire to lock said clip against longitudinal movement along said support wire,
   the tie including a thin wide strap of a plastic material with ends thereof located through said at least two spaced apart elongate apertures in the body such that the strap is anchored to the clip and forms a loop extending from said clip such that a part of a plant can be located therewithin.

2. The invention of claim 1 wherein said locating means comprise slotted portions which extend transversely of the inner end of said slots.

3. The invention of claim 2 wherein the transverse slotted portions are shaped to accommodate said wire support such that edge portions thereof can wedgingly engage with the surface of said wire support.

4. The invention of claim 3 wherein the body is formed from metal in the form of thin sheet spring steel.

5. The invention of claim 4 wherein an area of the material defining the sides of said slots is bent out of the plane of the body.

6. The invention of claim 3 wherein the ends of each said transverse slotted portion are curved.

7. The invention of claim 3, wherein said elongate apertures are located to the side of said transverse slotted portions which is opposite to that from which said open ended slots extend toward said common side.

8. The invention of claim 6 wherein said at least two spaced apart elongate apertures comprise three elongate apertures disposed in a spaced apart substantially parallel array, each of said elongate apertures having at least one serrated edge.

9. The invention of claim 8, wherein side edges of said strap are of curved profile.

10. The invention of claim 1 wherein said at least two spaced apart elongate apertures are positioned between opposite sides of said locating means.

* * * * *